Sept. 14, 1926.

S. E. MILLER

SHORT CIRCUITING DEVICE

Filed Oct. 31, 1925

1,600,124

WITNESSES
Lawrence Hopkins
Harry E. Seidel

INVENTOR
S. E. Miller,
BY
ATTORNEYS

Patented Sept. 14, 1926.

1,600,124

UNITED STATES PATENT OFFICE.

SAMUEL E. MILLER, OF SPRINGFIELD, OHIO.

SHORT-CIRCUITING DEVICE.

Application filed October 31, 1925. Serial No. 66,059.

This invention relates to a control for electric motors or generators and has for its object the provision of a device for short circuiting the motor in order to prevent overloading the same.

A further object of the invention is the provision of a governor to be attached directly to the motor shaft and which has a plurality of balls mounted in the casing which are adapted to be forced radially outward from the shaft for operating an element which will short circuit the commutator of the motor and thus prevent the motor from being overloaded, spring means being provided to return the centrifugally operated balls to the normal inoperative position when the speed of the motor has been reduced.

This invention will be best understood from a consideration of the following detailed description in view of the accompanying drawing forming a part of the specification; nevertheless it is to be understood that the invention is not confined to the disclosure, being susceptible of such changes and modifications which shall define no material departure from the salient features of the invention as expressed in the appended claims.

Figure 1:
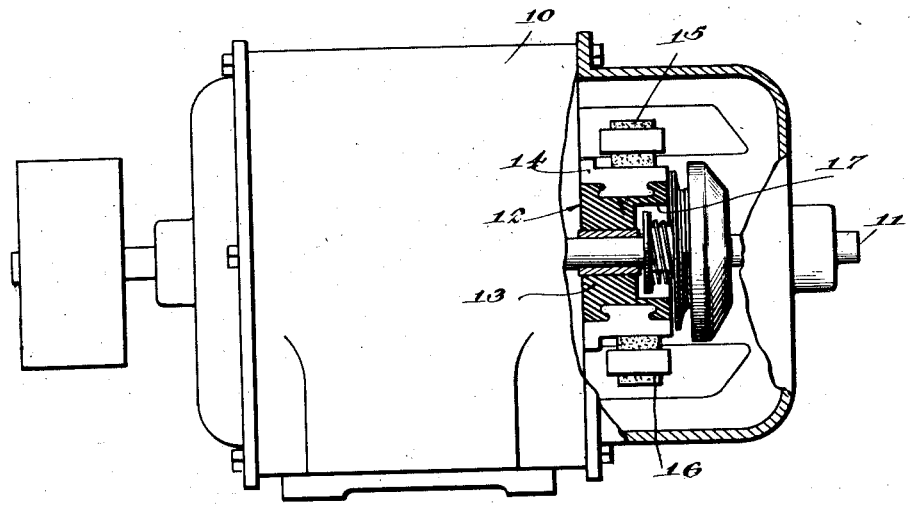
Figure 1 is a side view of a motor partly in section showing my invention applied thereto.
Figure 2:
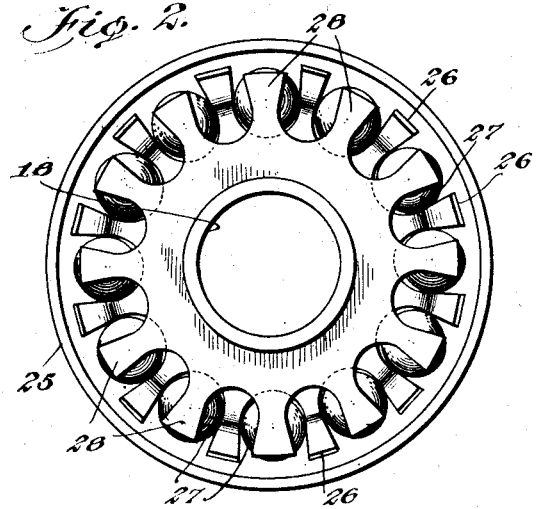
Figure 2 is a plan view of the centrifugally operated controlling device.
Figure 3:
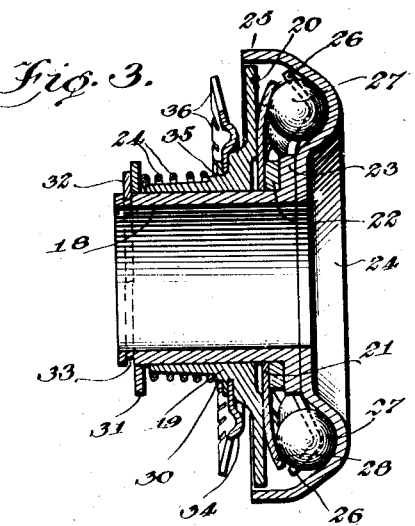
Figure 3 is a vertical section of the complete device for controlling the motor.
Figure 4:
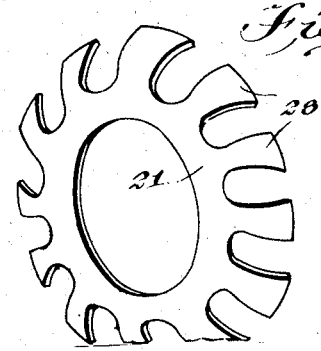
Figure 4 is a view in perspective of the resilient cup shaped member provided with fingers for maintaining the centrifugally operated balls in a normal inoperative position at a predetermined speed of the motor.

Referring more particularly to the drawings, 10 designates an electric motor having a shaft 11 and a commutator 12 secured to the shaft, said commutator being provided with the usual insulating sleeve 13 and spaced insulated metal segments 14. Brushes 15 and 16 are normally positioned for contact with the revolving commutator.

The insulated portion of the commutator is provided with a recess 17 adapted to receive the inner end of the metal sleeve 18 of the device forming my invention which is secured to the shaft 11 and slidably mounted on a second sleeve 19.

The sleeve 19 is provided with an angular flange 20 at its outer end which is adapted to press against a cup-shaped resilient member 21. The washer 22 is located between the cup-shaped member 21 and the flange 23 on the outer end of the sleeve 18.

Welded to the flange 23 of the sleeve 18 is a brace 24 having an inturned flange 25 adapted to be normally alined with the periphery flange 20 of the sleeve 19. A plurality of fingers 26 are secured to the flange 23 or formed integrally therewith and adapted to engage opposite sides of centrifugally operated metal balls 27. The fingers 26 are wider at their outer ends than at their inner ends and provide tracks for guiding the radial movements of the balls 27 when the motor reaches a predetermined speed. The cup-shaped member 21 is likewise provided with spaced fingers 28 which are disposed directly over the balls 27.

A coil spring 29 embraces the sleeve 19 and engages a shoulder 30 on said sleeve at one end and a washer 31 which is held in place by an actuator shaft member 32 which is received within an annular groove 33 formed at the inner end of the sleeve 18.

The metal member 34 which is slightly cupped and provided with a central perforation has the metal adjacent the central perforation forced into a groove 35 formed in the sleeve 19. The member 34 is provided with a plurality of fingers 36 adapted to be slightly spaced from the outer end segments 14 of the commutator 12.

The operation of my device is as follows: The balls 27 are normally maintained adjacent the periphery of the flange 23 until the speed of the motor passes a predetermined degree whence the balls will be forced outwardly against the fingers 28 of the cup-shaped member 21 and force the cup-shaped member inwardly, thereby moving the sleeve 19 inwardly and carrying with said sleeve the contact member 34. At this time the fingers 36 which are adjacent the outer ends 13 of the commutator are brought into contact with said ends so that the circuit to the motor is shorted whence the speed of the motor will be reduced. As soon as the speed decreases the spring fingers 28 of the member 21 will force the balls 27 back to their normal inoperative position adjacent the periphery of the flange 23 on the sleeve 18, and through the spring 29 the sleeve 19 will be forced outwardly carrying with it the contact fingers 36 of the contact 34 and thereby permit the circuit to normally flow through the motor to operate the same in the usual manner.

What I claim is:—

1. A motor having a driven shaft and a commutator, a control for said motor comprising a disc mounted for longitudinal movement on the motor shaft, a casing driven by the shaft and provided with a plurality of centrifugally operated balls, a disc on the shaft and provided with a plurality of spring fingers adapted to force the balls to their normal position at a predetermined reduced speed of the motor.

2. A motor having a driven shaft and commutator, a control for said motor comprising a disc mounted for longitudinal movement on the motor shaft, a casing driven by the shaft and provided with a plurality of radially disposed tracks, a ball mounted in each track and adapted to be centrifugally operated, a disc on the shaft and provided with a plurality of fingers adapted to engage the balls and force them back to normal inoperative position at a predetermined speed of the motor.

3. A motor having a driven shaft and commutator, a control for said motor comprising a disc mounted for longitudinal movement on the motor shaft, a casing driven by the shaft and provided with a plurality of radially disposed tracks, a ball mounted in each track and adapted to be centrifugally operated, a disc on the shaft and provided with a plurality of fingers adapted to engage the balls and force them back to normal inoperative position at a predetermined speed of the motor, said fingers being resilient and located directly over the tracks and curved to engage the centrifugally operated balls.

4. A motor having a driven shaft and a commutator, a control for said motor comprising a disc mounted for longitudinal movement on the motor shaft, a casing driven by the shaft and provided with a plurality of centrifugally operated balls, a disc on the shaft and provided with a plurality of spring fingers adapted to force the balls to their normal position at a predetermined reduced speed of the motor, the last mentioned disc being adapted to be moved longitudinally of the shaft when the balls are forced out by centrifugal action, and a spring embracing the shaft and intending to resist movement of the first mentioned disc towards the commutator.

5. A motor having a driven shaft and commutator, a motor control comprising a sleeve driven by the shaft, a casing rigid with the sleeve and provided with an annular track, a plurality of balls mounted in said track, a plurality of radially disposed guides forming spaced radial tracks for the balls, a disc mounted on the sleeve and provided with a plurality of spring fingers adapted to be engaged by the balls and moved longitudinally of the sleeve, a second sleeve slidable longitudinally on the first mentioned sleeve, a disc having its periphery slightly spaced from the segments of the commutator and connected with the second mentioned sleeve, said second mentioned sleeve provided with a flange adapted to be in engagement with the first mentioned disc, a spring resisting movement of the second mentioned sleeve and disc to maintain the periphery of the second mentioned disc out of contact with the segments of the commutator, said balls at a predetermined speed of the motor being forced outwardly against the resilient fingers and moving the first mentioned and second mentioned sleeve towards the commutator whereby the second mentioned disc is forced into contact with the segments of the commutator for short-circuiting the same.

SAMUEL E. MILLER.